United States Patent [19]
Herkes

[11] 3,817,375
[45] June 18, 1974

[54] SEPARATING DEVICE

[76] Inventor: John W. Herkes, 425 High St., Wailuku, Hawaii 96793

[22] Filed: Feb. 28, 1973

[21] Appl. No.: 336,425

[52] U.S. Cl................................. 209/106, 29/132
[51] Int. Cl............................................ B07b 13/04
[58] Field of Search .......... 209/106, 94, 96, 93, 78, 209/98, 101; 29/124, 132

[56] References Cited
UNITED STATES PATENTS

| | | | |
|---|---|---|---|
| 2,266,506 | 12/1941 | Morse | 209/106 |
| 2,949,189 | 8/1960 | Haines | 209/106 |
| 2,976,550 | 3/1961 | Silver et al. | 209/106 X |
| 2,997,086 | 8/1961 | Armer | 209/106 X |
| 3,663,142 | 5/1972 | Cafarelli | 209/106 |

Primary Examiner—Allen N. Knowles

[57] ABSTRACT

A device for separating loose extraneous materials such as dirt, rocks, sand, soil and leaves from sugar cane stalks is a variable angle deflection chute and a series of pocketed rolls arranged in a slope inclined downwardly and upon which sloping deflection chute, the cane and extraneous materials is dropped to cascade on down the slope over the rolls. The pocketed rolls are power driven in a direction opposed to that of the cascading material. Spaced smooth rings of greater diameter than the pocketed sections and attached to the rolls hold the cane stalks out of contact with the pocketed surface; successful operation of the device requires material flow control for a thin blanket and loosening of dirt, rocks, soil, and leaves in prior steps of the sugar cane cleaning process.

10 Claims, 4 Drawing Figures

PATENTED JUN 18 1974

SEPARATING DEVICE

BACKGROUND OF THE INVENTION

The change in harvesting practices from hand cutting and handling to harvesting by heavy machines in the sugar cane industry has required improved processing methods at the factory to prepare the harvested material for sugar extraction. Almost all forms of machine harvesting have resulted in entangling of the sugar cane stalks with soil, sand, dust, rock, attached and fallen leaves. These extraneous materials are being removed by a variety of equipment in which the cane stalks are broken and passed through large volumes of water. A detailed description of typical machine harvesting and hauling operations creating the dirty, entangled cane can be found in my copending application, Ser. No. 309,896. The costs of cleaning cane with water are high not only because of the cost of the water itself, but also because of the sugar lost from the cane and the costs of separating soil and water to meet pollution control requirements. Thus there is a recent concerted program to develop methods to clean machine harvested cane by mechanical and air blast methods not involving water, both in the field and in the factory. A device somewhat similar to the present invention for removing dirt, sand, small rocks, and leaves has been that shown in Bolles U.S. Pat. No. 3,384,233 in which cane and extraneous material cascade down an inclined pocketed conveyor moving upward in a direction opposed to the cascading material. Pocketed conveyors have also been used to separate hops from stems as in Thys U.S. Pat. No. 2,116,006. Although the Bolles pocketed conveyor will remove some of the small rocks and soil, its effectiveness is limited by the steepness of the slope required to insure that cane stalks will not be stopped by the conveyor and carried up into the trash conveyors along with dirt, sand, etc.

Another type of cleaning device is the fluted roll as shown in Silver, et. al. U.S. Pat. Nos. 2,976,550, Hurdelbrink 2,565,559, and Silver et. al. 3,217,346, each of which are used to clean root crops such as sugar beets. Because the fluted roll would need to have sufficient space between rolls to pass small rocks, and the spiral flights on the rolls would pull cane and the long cane leaves into the spaces between rolls, it appears that adapting this device to the clenaing of sugar cane would result in jamming.

Other devices for removing extraneous materials from machine harvested sugar cane include air blasts. This requires high horsepower; the air blasts pick up and discard some cane along with extraneous material, and requires careful design to separate the waste material from the air stream.

BRIEF SUMMARY OF THE INVENTION

The object of this invention is to provide an efficient durable reliable means to separate foreign material from a flow of machine harvested sugar cane. This invention is an inclined mechanical separator which passes foreign material such as sand, soil, leaves and small rocks through the surface of the incline into a waste receiver below it while the sugar cane stalks remain on top to discharge free of this waste material onto a delivery chute. The surface of the incline is made up of a series of spaced parallel power driven rolls each of which is arranged at right angles to the slope. Each roll has a series of pocketed surfaces separated by smooth guard rings appreciably greater in diameter than the pocketed surfaces of the rolls. These rolls are driven in a direction opposed to the flow of material down the slope so that as foreign material drops on the pocketed surface it is caught in the pockets and carried over between rolls to drop out of the pockets beneath the rolls. The cane stalks being long, round, of greater diameter than the individual pieces of foreign material and smooth slide down over the pocketed surfaces of the rolls and should any pieces of cane stalk slide down the surface parallel to the rolls, the smooth guard rings hold them out and above the spaces between rolls so that they continue to slide down over the tops of the rolls to the delivery chute for clean cane. The angle of slope of a chute at the top of the separator is adjustable to control the speed of the material according to its condition as it passes down over the separator to the minimum required for the cane stalks to slide to the bottom thus insuring that foreign material is removed from the flow and that it will not remain with the cane stalks to the bottom of the slope because of momentum.

DETAILED DESCRIPTION OF THE INVENTION

Figure 1:
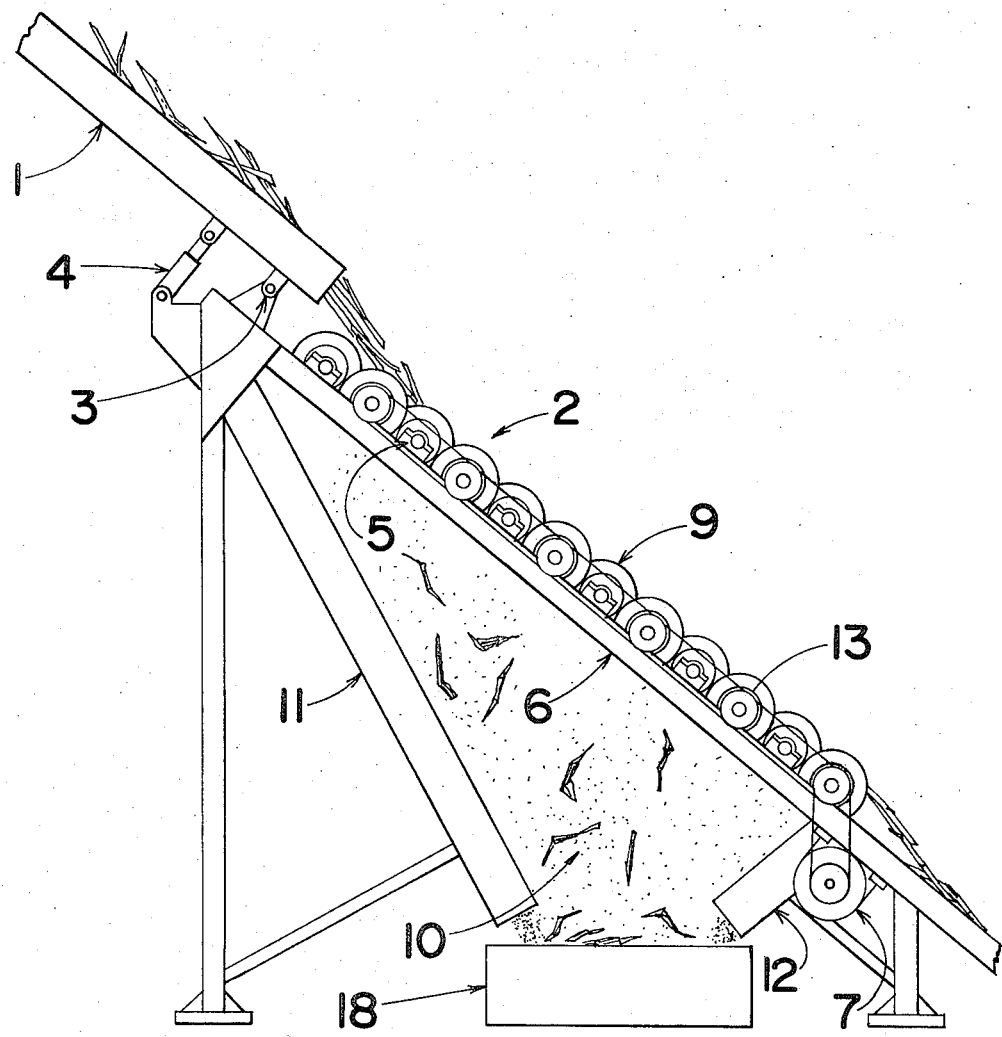
FIG. 1 is a side elevational schematic of a version of my mechanical sugar cane cleaning apparatus.

Referring to FIG. 1 a smooth plate or shute 1 receives the cane and extraneous material discharged from a conveyor (not shown) above it. The chute 1 is arranged on a slope so as to direct the material sliding down its surface onto a series of power driven rolls 2 arranged on a slope immediately below the receiving chute 1. Receiving chute 1 is supported on a pivot 3 on its lower edge and adjustable means 4 such as a hydraulic actuating cylinder supports the upper end and is used to selectively adjust the slope of chute 1 to control the velocity of the material entering the power driven rolls 2.

The rolls 2 are supported in bearings 5 on a framework 6 preferably at an angle of inclination of about 40 degrees above the horizontal, but possibly between 30 and 45 degrees above the horizontal.

Each of the rolls 2 is driven by electric motor 7 or other power means in a direction opposing the flow of material as indicated by the arrows 8. The rolls are preferably driven at a speed of approximately 250 feet per minute on the rolls outside surface.

A waste chamber 10 is disposed beneath the rolls 2 with sloping walls 11 and 12 to direct the extraneous material passing through the rolls 2 onto a waste receiver in the form of conveyor 13.

In comparison with other rolls used in cane cleaning machinery of my design and invention, rolls 2 are of a relatively small diameter preferably having an outside diameter of about 11 inches. Standard 10 inch schedule 160 steel pipe having a 10¾ inch outside diameter can be used as a primary element of my rolls with 4½ inch solid steel stub shafts 12 – 17 on each end. Steel guard rings 9 of one-half inch steel plate and 15 inch outside diameter are attached to the rolls 2 on a 12 inch spacing. The periphery of these guard rings 9 is smooth.

Figure 2:
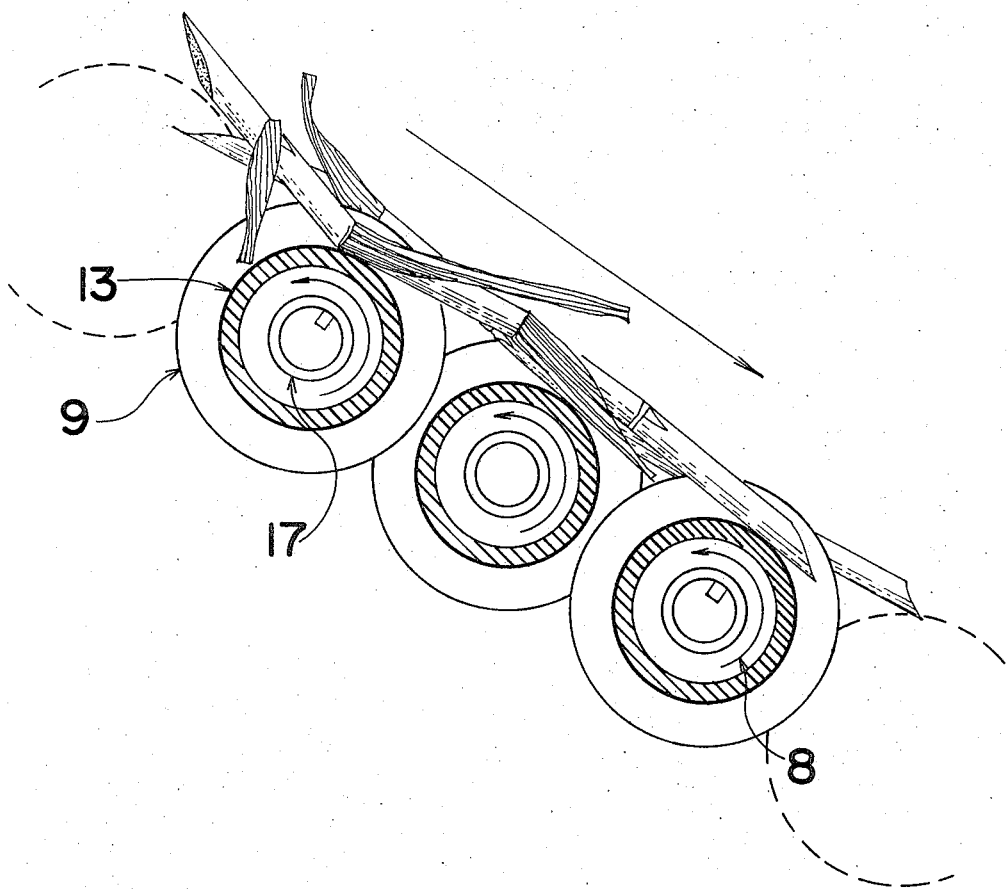
FIG. 2 is an enlarged view of a section of the rolls shown in FIG. 1.
Figure 3:
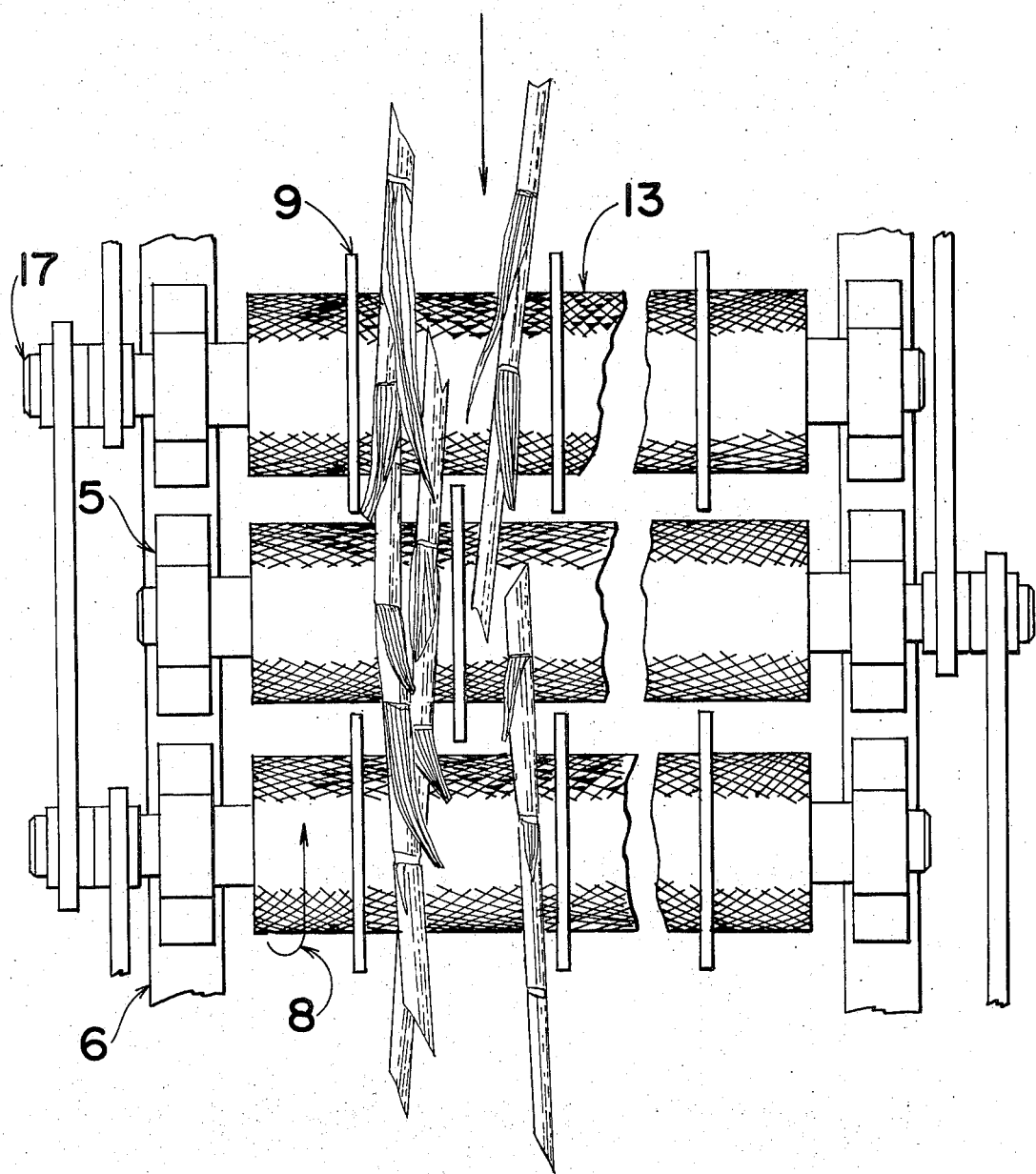
FIG. 3 is a plan view of a portion of the rolls shown in FIG. 2 as seen on a plane parallel to the slope.

As illustrated in FIGS. 2 and 3 guard rings 9 on adjacent rolls 2 are alternately centered so as to allow close roll spacing and to provide an effective support for cane stalks above the rolls 2 with a minimum number of guard rings 9.

Figure 4:
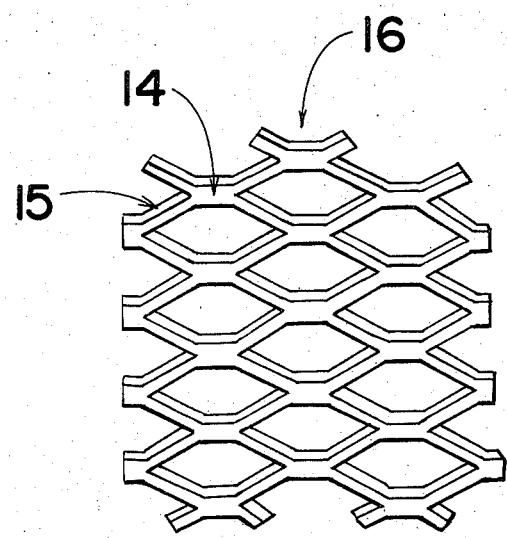
FIG. 4 illustrates typical expanded metal mesh as used on the surface of the rolls.

Attached to the outside of the roll surface between guard rings 9, I have wrapped expanded metal to form concentric cylinders 13. These cylinders 13 are preferably made from standard (not flattened) 1½ inch No. 10 expanded metal. An example of such expanded metal 14 is shown in FIG. 4. The 1½ inch designates the approximate width of mesh measured from center to center of bonds 16. The No. 10 indicates the gage or thickness of the steel from which it is formed, No. 10 being 0.138 inch thick.

Expanded metal is made by stretching metal sheets which have been pierced in an alternating pattern. The ribbons 15 of steel formed in this process twist so that the high points at the bonds 16 in 10 gage expanded metal are about one-fourth of an inch thick. I have found that this material applied to the outside of the roll 2 provides a very effective toothed surface to catch the soil, sand, and leaves falling onto it. However, I realize that other rough surfaces of about this same dimension, i.e. having a height above the roll of about one-quarter inch, could also effect the desired result. However, spiral or helical flutes would generally be unsatisfactory as material would build up at one side of the area between guard rails 9, promote wrap-up of cane leaves on the rolls and be less effective in driving the foreign material over the rolls into the waste chamber.

The open gap between adjacent rolls and alternate guard rings 9 to effectively pass small particles of extraneous material and leaves will preferably be about two inches wide by six inches long. A clearance of one-eighth of an inch is satisfactory between the periphery of each guard ring and the surface of the adjacent roll.

In FIG. 1 I have shown a form of my invention in which 12 rolls are used. At the angle shown the roll section alone totals about 8½ feet in height. Including the receiving chute 1 and a cane delivery plate, this height could total 16 feet. More effective cleaning could be accomplished by adding more rolls thus increasing the overall height of installation or by conveying the cleaned cane from a first set of extracting rolls up to the top of a second set of my pocketed rolls.

MODE OF OPERATION OF THE INVENTION

Machine harvested sugar cane is fed onto the receiving chute 1 from the preceding conveyor having been previously treated by blanket leveling and thinning processes and by shaking and screening processes to loosen adhered dirt, dust, sand, samll stones, and leaves. When this material strikes the receiving chute 1 it is deflected at various angles according to the type of material and the effect of adjacent objects to spread out over the surface of the top rolls 2.

The angle of inclination of receiving chute 1 is adjusted with hydraulic cylinder 4 to slow down the falling cane deposited upon it by the preceding conveyor to as slow a speed as possible to carry the material on down over my pocketed rolls 2. This allows ready speed control to match the condition of the material delivered to the separator which varies in density, water content and size of stalk as a result of differences in harvesting methods, weather, field conditions, and cane variety.

Since guard rings 9 are effectively 6 inches apart and are smooth, cane stalks sliding down over the rolls 2 with the length of the stalks generally transverse to or across the slope are held off the rough roll surface by the guard rings 9. If cane stalks pass down the slope with the length of the cane stalk disposed generally longitudinal to or along the slope they will slide over the rolls 2 easily bridging the gaps between the rolls. Extraneous material such as soil, sand, and stones being much shorter than cane will not be supported on the guard rings 9 but will strike the upper surface of the rolls 2, such surface being almost horizontal. An individual particle may not be caught in the pockets formed by the expanded steel cylinder 13 on the first roll that it strikes. However, aided by the reverse direction of the roll it will be decelerated so that when it hits the second or third roll it will probably be stopped and fed around with the roll to fall into the waste chamber 8. Leaves likewise will be fed between the rolls to fall into the waste chamber 8 since leaves are too limber to be carried by the guard rings 9 and too light and limber to bounce. Should a leaf tend to ride down over a series of expanded steel cylinders 13 it will soon be stopped by the rough surface of the expanded metal to be fed through the rolls 2 into the waste chamber 8.

The velocity of the cane falling down from the preceding conveyor will be up to 100 feet per minute but the speed of the cane across my extractor rolls 2 will be much slower as controlled by the receiving chute 1 while the peripheral speed of the pocketed rolls 2 is about 250 feet per minute in the opposite direction to the cascading cane.

Although the preferred operation of cleaning systems for machine harvested cane is without water to avoid the loss of sugar into the cleaning water and to eliminate the cost of water, my mechanical sugar cane cleaning apparatus as disclosed herein can be operated effectively in either a wet or dry cleaning process.

A final cleaning of the cane stalks by a light spray of water can be used at the lower portion of the separator without incurring appreciable loss of sugar and without much cost for water.

The surface of the expanded steel cylinders 13 need not be cleaned as even when partially filled with extraneous material a sufficiently rough surface is provided to feed the extraneous material through and between rolls. However, occasional cleaning can easily be effected with water.

I claim:

1. In an apparatus for cleaning machine harvested sugar cane, a separating device for removing extraneous material such as leaves, small rocks, sand, soil, etc. from sugar cane stalks comprising:
    a. a series of rolls each of which is about eleven inches in diameter,
    b. bearings for each roll allowing rotation of the roll about its central axis,
    c. supports for said rolls on their bearings whereby the rolls are disposed transverse to the incline and are arranged in parallel spaced relationship on a downward incline from the point that the machine harvested sugar cane is deposited thereon, d. driving means to forcibly rotate each roll so that the top of each roll is moving towards the top of the incline, e. a series of guard rings of smooth exterior and of a larger diameter than the rolls and attached concentrically to and in spaced relationship on each roll, f. a means providing a rough surface on the roll exterior between the guard rings whereby as sugar cane stalks with extraneous material cascades down over the rolls the extraneous material is carried between the rolls by the rough surface to drop from the bottom of the rolls and the sugar cane stalks are carried over the rolls being prevented from passing between the rolls by said guard rings.

2. A separating device as claimed in claim 1 wherein the angle of said incline is 30 to 45 degrees from the horizontal.

3. A separating device as claimed in claim 1 also comprising a receiving chute, support means for said receiving chute such that the receiving chute is higher than the top roll and on an incline to direct material placed on it onto the top rolls and a means to adjust the angle of incline of the receiving plate for velocity control of the material sliding over the receiving plate onto the rolls.

4. A separating device as claimed in claim 1 wherein the roll driving means causes the rolls to rotate at a peripheral speed of approximately two hundred and fifty feet per minute.

5. A separating device as claimed in claim 1 wherein the guard rings on adjacent rolls are alternately spaced.

6. A separating device as claimed in claim 1 where in the space between adjacent rolls is about two inches.

7. A separating device as claimed in claim 1 wherein the space between alternately spaced guard rings on adjacent rolls is about six inches.

8. A separating device as claimed in claim 1 wehrein the means for providing a rough surface on the roll exterior between the spaced rings is expanded metal formed to fit the roll exterior and attached thereto, the openings in said expanded metal forming pockets.

9. A separating device as claimed in claim 1 also comprising waste directing walls and a waste receiver disposed beneath said rolls whereby extraneous materials dropping from the bottom of the rolls will fall directly onto said waste receiver or be directed by said walls onto said waste receiver.

10. A separating device as claimed in claim 1 also comprising waste directing walls and a waste receiver disposed beneath said rolls and a clean cane stalk directing chute disposed adjacent to and down said incline from the last roll whereby extraneous materials dropping from the bottom of the rolls will fall directly onto said waste receiver or be directed by said walls onto said waste receiver and clean stalks will be directed separately by said chute.

* * * * *